United States Patent
Fjellstad et al.

(10) Patent No.: US 11,210,488 B2
(45) Date of Patent: Dec. 28, 2021

(54) METHOD FOR OPTIMIZING IMPROPER PRODUCT BARCODE DETECTION

(71) Applicant: ZEBRA TECHNOLOGIES CORPORATION, Lincolnshire, IL (US)

(72) Inventors: Christopher J. Fjellstad, Smithtown, NY (US); David R. Turturro, Farmingville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/698,075

(22) Filed: Nov. 27, 2019

(65) Prior Publication Data

US 2021/0158000 A1  May 27, 2021

(51) Int. Cl.
*G06K 7/14* (2006.01)
*G06K 7/10* (2006.01)

(52) U.S. Cl.
CPC ....... *G06K 7/1473* (2013.01); *G06K 7/10881* (2013.01); *G06K 7/1413* (2013.01); *G06K 2007/10524* (2013.01)

(58) Field of Classification Search
CPC .............. G06K 7/1473; G06K 7/1413; G06K 7/10881; G06K 2007/10524
See application file for complete search history.

(56) References Cited

U.S. PATENT DOCUMENTS

| | | | |
|---|---|---|---|
| 2004/0111320 A1 | 6/2004 | Schlieffers et al. | |
| 2004/0223663 A1* | 11/2004 | Cato | G06K 7/10851 382/318 |
| 2010/0059589 A1 | 3/2010 | Goncalves et al. | |
| 2013/0001290 A1* | 1/2013 | Trajkovic | G07G 1/0063 235/375 |
| 2015/0193780 A1* | 7/2015 | Migdal | G06Q 30/018 705/317 |
| 2016/0180130 A1 | 6/2016 | Bremer | |
| 2020/0242392 A1* | 7/2020 | Scott | G06K 7/1473 |

OTHER PUBLICATIONS

International Search Report and Written Opinion for International Application No. PCT/US2020/053807 dated Dec. 14, 2020.

* cited by examiner

*Primary Examiner* — Seung H Lee
(74) *Attorney, Agent, or Firm* — Yuri Astvatsaturov (57) ABSTRACT

Methods for optimizing improper product barcode detection are disclosed herein. An example method, includes analyzing an object-based identification data against an indicia-based identification data to determine if there is a match. Responsive to there not being a match, entering a release condition state, where, instead of automatically sending a failed match signal to a symbology reader, a remote server awaits satisfaction of the release condition, before sending to the symbology reader. In some examples, a release condition is automatically satisfied by identifying a match in a subsequent comparison. In some examples, a user of the remote server is to satisfy the release condition.

15 Claims, 4 Drawing Sheets

METHOD FOR OPTIMIZING IMPROPER PRODUCT BARCODE DETECTION

BACKGROUND

In many retail environments an unscrupulous individual can replace or overlay a Universal Product Code (UPC) barcode label on an expensive product with a UPC barcode label from a less expensive product. Sometimes individuals remove barcode labels off the less expensive product and overlay it. Other times individuals bring pre-printed barcode labels from the outside. This practice is called spoofing or ticket switching. And, if a retailer does not catch the spoofing attempt, then the retailer is then denied both the cash difference between the higher cost and the lower cost item, as well as the ability to accurately know and track the inventory levels of both products.

Techniques for detecting improper product barcodes have been developed. These include decoding barcode payloads and comparing the product associated with the barcode payload with other information on the product, such as image data on the product. However, many current techniques are often inaccurate and can generate false-positives, where a barcode scan is flagged as a spoofing attempt, when it is not. These false-positives are particularly problematic for merchants. They can result in wrongful accusations of a customer; and they can slow down the checkout process. There is a need for optimizing proper product barcode detection.

SUMMARY

In an embodiment, the present invention is a computer-implemented method for improper object detection. The method comprises receiving, at one or more processors, an image of an object, the image captured by an symbology reader; analyzing, at the one or more processors, the image of the object and determining a first object identification data from the image; analyzing, at the one or more processors, an indicia in the image of the object and determining a second object identification data from the indicia; responsive to analyzing the indicia, determining, at the one or more processors, that the first object identification data matches the second object identification data, and communicating a condition satisfied signal for a user to the symbology reader; and determining, at the one or more processors, that the first object identification data does not match the second object identification data and preventing communication of the condition satisfied signal and awaiting, at the one or more processors, a release condition, before communicating the condition satisfied signal for the user.

In a variation of this embodiment, the method further comprises: in response to determining that the first objection identification data does not match the second object identification data, repeating these processes for one or more subsequent images of the object captured by the symbology reader. The method further includes upon determining that the first object identification data does match the second object identification data for the one or more subsequent images, thereby satisfying a release condition, communicating the condition satisfied signal for the user to the symbology reader; and upon determining that the first object identification data does not match the second object identification data for the one or more subsequent images, sending a condition failed signal to a remote monitor.

In another variation of this embodiment, the method further comprises: in response to determining, at the one or more processors, the first object identification data does not match the second object identification data, sending a condition failed signal to a remote monitor; and awaiting, at the one or more processors, a release condition from the remote monitor, and communicating the condition satisfied signal for the user in response to the release condition from the remote monitor.

In yet another variation of this embodiment, the method further comprises: determining the first object identification data at the symbology reader; determining the second object identification data at the symbology reader; communicating the first object identification data and the second object identification data to an inventory management system communicatively coupled to the symbology reader through a communication network; and comparing the first object identification data to the second object identification data at the inventory management system for determining when the first object identification data matches and does not match the second object identification data.

In yet another variation of this embodiment, the method comprises: determining the second object identification data at the symbology reader; sending the image to an inventory management system communicatively coupled to the symbology reader through a communication network; determining the first object identification data at the inventory management system; and comparing the first object identification data to the second object identification data at the inventory management system for determining when the first object identification data matches and does not match the second object identification data.

In another embodiment, a computer-implemented method for improper object detection is provided. The method comprises: receiving, at an inventory management system and from a symbology reader, a plurality of images of an object collected over repeated image scan cycles; receiving, at the inventory management system and from the symbology reader, an indicia-based identification data determined from an indicia associated with the plurality of images; analyzing, at the inventory management system, the plurality of images and determining an object-based identification data from the image; determining, at the inventory management system, that the indicia-based identification data matches the object-based identification data over the repeated image scan cycles, and communicating a condition satisfied signal to a user of the inventory management system; and determining, at the inventory management system, that the indicia-based identification data does not match the object-based identification data over the repeated image scan cycles, and identifying the repeated image scan cycles as a failed scan to a user of the inventory management system.

In a variation of this embodiment, the method comprises: receiving from the symbology reader a symbology reader identifier, for identifying the symbology reader among a plurality of symbology readers in a location; providing the symbology reader identifier to a user of the inventory management system; providing at least one of the plurality of images to the user; and awaiting instruction from the user before communicating the condition satisfied signal or before identifying the repeated image scan cycles as the failed scan.

In another variation of this embodiment, the method comprises: receiving from the symbology reader a symbology reader identifier, for identifying the symbology reader among a plurality of symbology readers in a location; providing the symbology reader identifier to a user of the inventory management system; providing the indicia-based identification data and the object-based identification data to the user; and awaiting instruction from the user before communicating the condition satisfied signal or before identifying the repeated image scan cycles as the failed scan.

In yet another embodiment, a system comprises: a symbology reader comprising: a housing; an imaging assembly within the housing and configured to capture a plurality of images of an object; and a processor and a memory storing instructions that, when executed, cause the processor to: determine, from one or more of the plurality of images, an indicia-based identification data for the object; and send the indicia-based identification data and at least one of the plurality of images to a remote server, as image scan data; and the remote server having a processor and a memory storing instructions that, when executed, cause the processor of the remote server to: determine, form the at least one of the plurality of images, an object-based identification data for the object; determine when the indicia-based identification data matches the object-based identification data and communicate a condition satisfied signal for a user of the inventory management system; and determine when the indicia-based identification data does not match the object-based identification data and communicate a failed scan signal to the user of the inventory management system.

In a variation of this embodiment, the memory of the remote server stores further instructions that, when executed, cause the processor of the remote server to: determine when the indicia-based identification data matches the object-based identification data over repeated image scans and communicate the condition satisfied signal for the user of the inventory management system; and determine when the indicia-based identification data does not match the object-based identification data over repeated image scans and communicate the failed scan signal to the user of the inventory management system.

In a variation of this embodiment, the memory of the remote server stores further instructions that, when executed, cause the processor of the remote server to: receive, from the symbology reader, a symbology reader identifier, for identifying the symbology reader among a plurality of symbology readers in a location; provide the symbology reader identifier to the user of the inventory management system; provide the at least one of the plurality of images to the user of the inventory management system; and await instruction from the user of the inventory management system before communicating the condition satisfied signal or the failed scan signal.

In a variation of this embodiment, the memory of the remote server stores further instructions that, when executed, cause the processor of the remote server to: receive, from the symbology reader a symbology reader identifier, for identifying the symbology reader among a plurality of symbology readers in a location; provide the symbology reader identifier to the user of the inventory management system; provide the indicia-based identification data and the object-based identification data to the user of the inventory management system; and await instruction from the user before communicating the condition satisfied signal or the failed scan signal.

In yet another embodiment, a system comprises: a symbology reader comprising: a housing; an imaging assembly within the housing and configured to capture a plurality of images of an object; and a processor and a memory storing instructions that, when executed, cause the processor to: determine, from one or more of the plurality of images, an indicia-based identification data for the object; and send the indicia-based identification data and at least one of the plurality of images to a server, as image scan data; and the server configured to: determine, form the at least one of the plurality of images, an object-based identification data for the object; determine when the indicia-based identification data matches the object-based identification data and communicate a condition satisfied signal for a user of the inventory management system; and determine when the indicia-based identification data does not match the object-based identification data and communicate a failed scan signal to the user of the inventory management system.

In a variation of this embodiment, the server is implemented on the processor and memory. In another variation of this embodiment, the server is implemented on another processor and another memory.

In a variation of this embodiment, the server is communicatively coupled to an inventory management system through a communication network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a method, and related systems and devices, are described for improper object detection.

Conventional systems for detecting improper products at a point-of-sale typically involve scanning a product barcode and decoding that barcode generating a payload that is used to identify the product associated with that barcode. This first product information is then compared with second product information obtained by analyzing images of the product. When the first product information fails to match the second product information, the system determines that the scanned barcode does not correspond to the actual product, and an improper product detection is determined. This match failure is then flagged at the point-of-sale or to a manager monitoring the checkout area. This allows for identifying "ticket switching" theft attempts.

Unfortunately, conventional systems are susceptible to false positives. In some instances, the first and second product information do not match for reasons that are unrelated to any "ticket switching" or other theft attempt. The cashier or customer may simply have scanned the wrong barcode. Yet, once an improper product detection has occurred, a manager may be flagged to come assist the customer, slowing down the scanning process, and creating the possibility of false accusations against the customer. Indeed, the mere process of product information comparison takes time and can slow down the checkout process. For example, a customer may scan a product barcode but not receive confirmation of a proper product scan until after the system as compared the product information determined from that barcode to the product information determined from an image of the product.

The present techniques, however, are able to provide for improper barcode detection in a more accurate manner, avoiding false-positives, and generally accelerating the checkout process. For example, in various embodiments, a method for improper object detection includes capturing an image of an object by symbology reader and analyzing the image of the object to determine a first object identification data from the image. The method further includes analyzing an indicia in the image of the object and determining a second object identification data from the indicia. When the first object identification data matches the second object identification data, a condition satisfied signal may be communicated to a user for example to the symbology reader. Yet, when the first object identification data does not match the second object identification data, that communication is prevented until a subsequent release condition is met and then, after that release condition is met, the condition satisfied signal is communicated to the user. In this way, a failed match of object identification data does not result in an improper object detection. Instead a subsequent release condition is to be met before such a determination.

As used herein, the condition satisfied signal may be presented to a user as an audible indication, such as a beep, or as a visual indication, such as a LED flash, flickering of a light emitting from a symbology reader or other indication. Similarly, failed scan signals may be presented to a user, such as a remote manager, as an audible indication or as a visual indication, later may include an image of a scanned product, an image of object identification data, a combination of the two, an image of a barcode, or other indication.

In some examples, the comparison of the first object identification data to the second object identification data is determined as the symbology reader. In some such examples, in response to a determination that the first object identification data does not match the second object identification data, the symbology reader sends a condition failed signal is sent to a remote monitor and awaits the release condition from the remote monitor.

In some examples, the first object identification data and the second object identification data are determined at the symbology reader and communicated to an inventory management system, at a remote server, where the remote server performs the comparisons and determines where a release condition is met.

In some examples, one or both of the first object identification data and the second object identification data is determined at the remote server, based on images and indicia data sent from a symbology reader.

In some embodiments, a method includes receiving a plurality of images of an object collected over repeated image scan cycles. An indicia-based identification data is determined from an indicia associated with the plurality of images. Further, an object-based identification data is determined from the plurality of images. At an inventory management system, the indicia-based identification data is compared to the object-based identification data over repeated image scan cycles to identify a match. When a match occurs over repeated cycles, a condition satisfied signal is communicated to a user of the inventory management system. When a match fails to occur over the repeated image scan cycles a failed scan is determined and communicated to a user of the inventory management system. In some such examples, the failed scan results in an improper product determination. In some such examples, a user is provided with an ability to override a failed scan and authorize the product.

Figure 1:
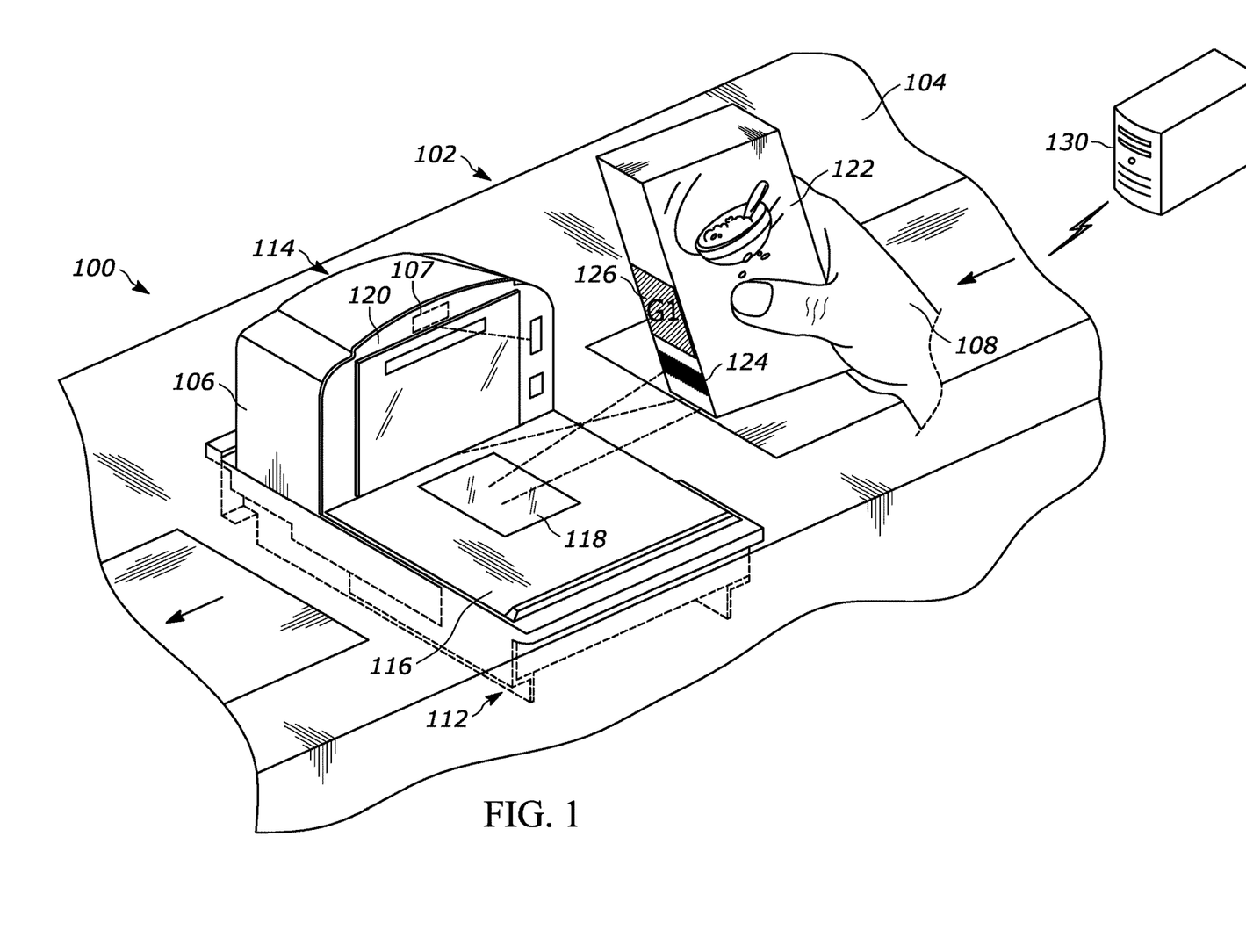
FIG. 1 is a perspective view of an example imaging system, implemented in an example point-of-sale (POS) system, having a bi-optical (also referred to as "bi-optic") imager, showing capture of an image of an object.

FIG. 1 illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") symbology reader 106 (that may be used in the object recognition systems and methods described herein), and an additional camera 107 at least partially positioned within a housing of the barcode reader 106. In examples herein, the symbology reader 106 is referred to as a barcode reader. Further, in examples herein, the camera 107 may be referred to as an image acquisition assembly and may be implemented as a color camera or other camera configured to obtain images of an object.

Imaging systems herein may include any number of imagers housed in any number of different devices. While FIG. 1 illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter).

In the illustrated example of FIG. 1, the barcode reader 106 captures images of an object, in particular a product 122, such as for example a box. In some implementations, the barcode reader 106 captures these images of the product 122 through one of the first and second optically transmissive windows 118, 120. For example, image capture may be done by positioning the product 122 within the fields of view FOV of the digital imaging sensor(s) housed inside the barcode reader 106. The barcode reader 106 captures images through these windows 118, 120 such that a barcode 124 associated with the product 122 is digitally read through at least one of the first and second optically transmissive windows 118, 120.

In the illustrated example of FIG. 1, additionally, the barcode reader 106 captures images of the product 122 using the camera 107, which captures images and generates image data that can be processed to verify that the product 122 scanned matches the barcode 124 and/or image data can be used to populate a database.

Figure 3:
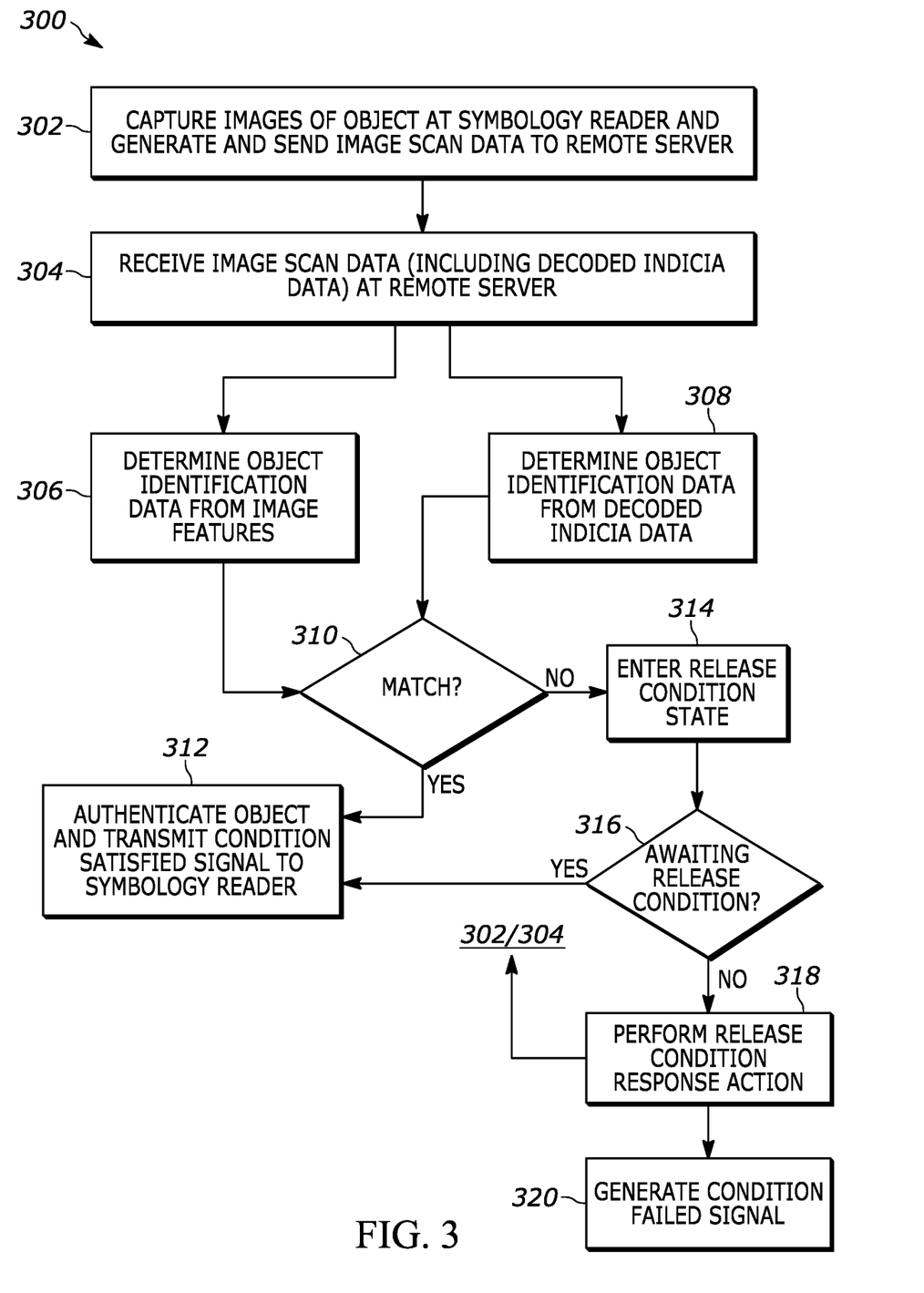
FIG. 3 illustrates is a block diagram of an example process as may be implemented by the logic circuit of FIG. 2, for implementing example methods and/or operations described herein including techniques for improper object detection.
Figure 4:
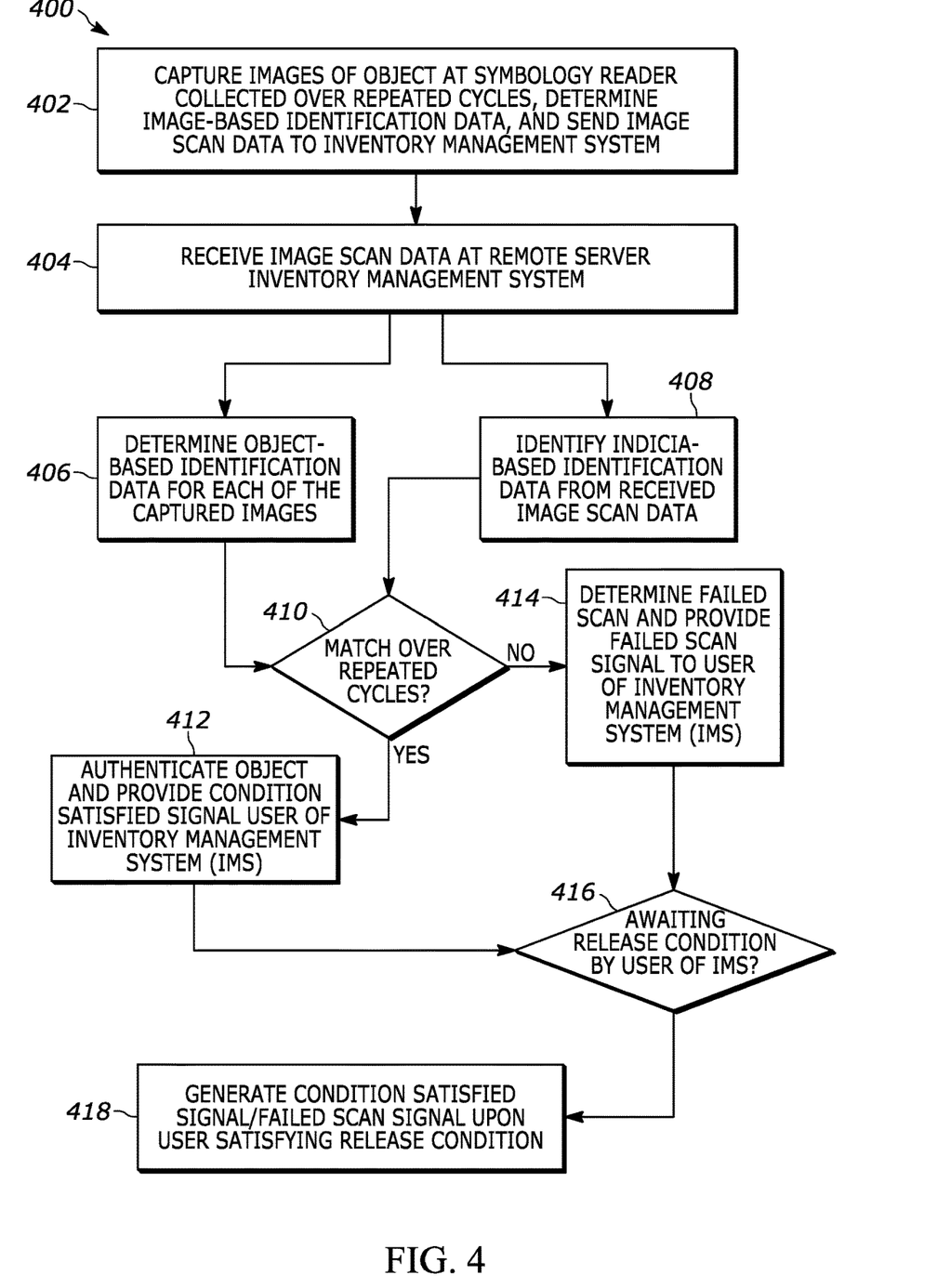
FIG. 4 illustrates is a block diagram of another example process as may be implemented by the logic circuit of FIG. 2, for implementing example methods and/or operations described herein including techniques for improper object detection.

To implement operations of the example object detection techniques herein, including those of FIGS. 3 and 4, images captured through any of the windows 118, 120 or the camera 107 may be used for identifying the product 122, such as through determining a first object identification data using image captured of the product 122 and determining a second object identification data using the barcode 124, and comparing the two identification data.

In the illustrated example of FIG. 1, the imaging system 100 includes a remote server 130 communicatively coupled to the barcode reader 106 through a wired or wireless communication link. In some examples, the remote server 130 is communicatively coupled to a plurality of imaging systems 100 positioned at checkout area of a facility, for example. In some examples, the remote server 130 is implemented as an inventory management server that generates and compares object identification data. In some examples, the remote server 130 is accessible by a manager for monitoring operation and improper product scanning by the imaging system 100.

Figure 2:
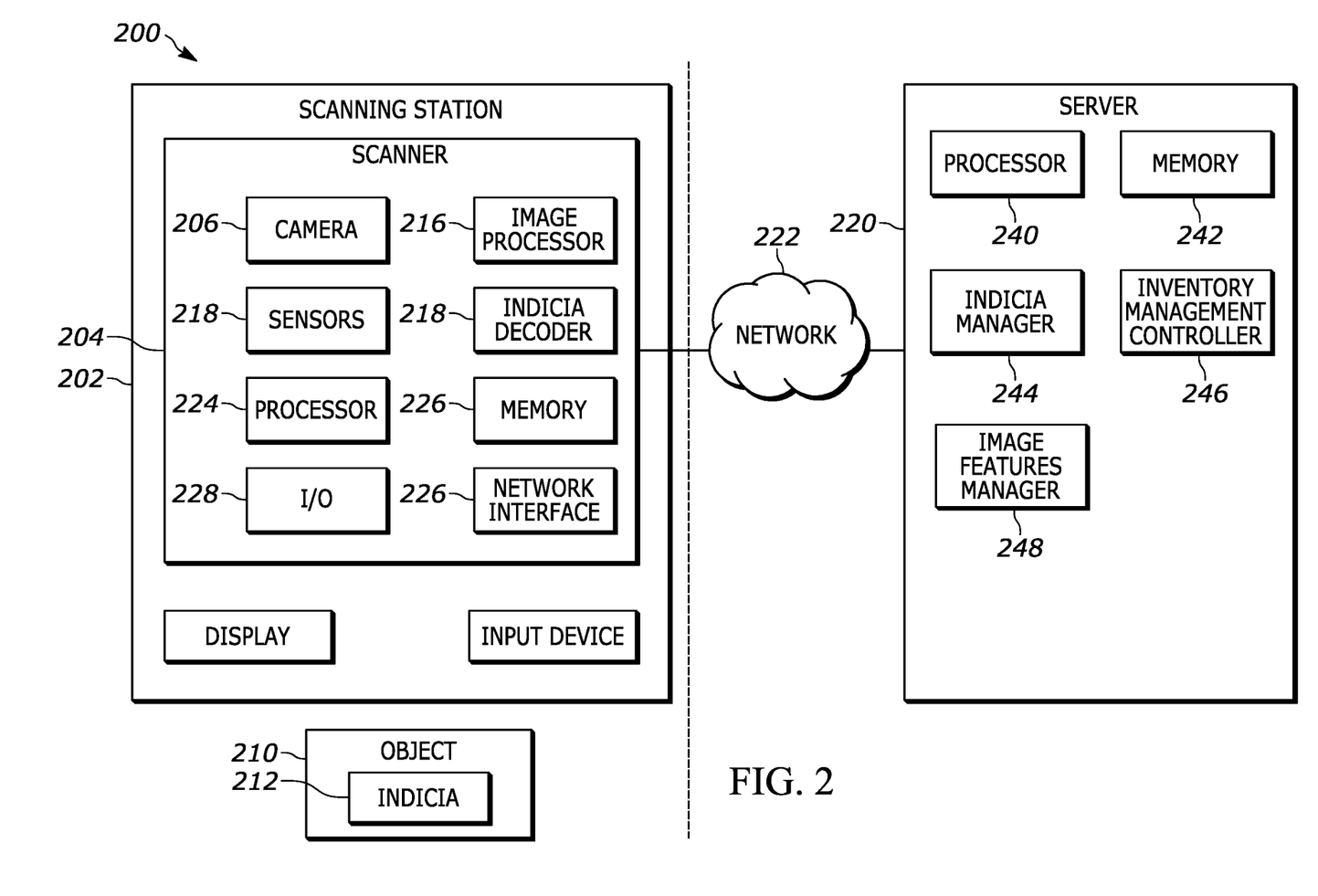
FIG. 2 illustrates a block diagram of an example logic circuit for implementing example methods and/or operations described herein including techniques for improper object detection.

FIG. 2 illustrates an example system where embodiments of the present invention may be implemented. In the present example, the environment is provided in the form of a facility having one or more scanning locations 200 corresponding to an imaging system, such as the imaging system 100 of FIG. 1, where various goods may be scanned for completing a purchase of an object and for improper object detection to override an improper purchase attempt.

In the illustrated example, the location 200 is a point of sale location and includes a scanning station 202 having a symbology reader 204, such as a bi-optic barcode reader like barcode reader 106 in FIG. 1. The symbology reader 204 may include a scanner, such as a barcode scanner, or any type of symbology reader, such as an RFID tag reader. In the example of FIG. 1, the symbology reader 204 is also described as a scanner 204, for convenience sake, although any type of symbology reader is meant to be included.

The scanner 204 that includes an imaging device 206 (e.g., an imaging assembly in the form of a camera 206 or other photodetection device) and one or more sensors 208. The camera 206 captures images of an object 210 bearing an indicia 212, where in some examples, the camera 206 is a 1D, 2D or 3D image scanner capable of scanning the object 210. In some examples, the scanner 204 may be a barcode image scanner capable of scanning a 1D barcode, QR code, 3D barcode, or other symbology as the indicia 212, as well as capturing images of the object 210 itself. In the illustrated example, the scanning station 204 includes sensors 208, which may include an RFID transponder for capturing indicia data is the form of an electromagnetic signal captured from the indicia 212 when the indicia 212 is an RFID tag, instead of visual indicia, such as a barcode.

The scanner 204 also includes an image processor 216 and an indicia decoder 218. In some examples, the image processor 216 is a color imager capable of capturing a color image of an object. In some examples, the image processor 216 may be configured to analyze captured images of the object 210 and perform preliminary image processing, e.g., before images and image scan data is sent to a remote server 220 a network 222. The scanner 204 includes a network interface 226 that represents any suitable type of communication interface(s) (e.g., wired and/or wireless interfaces) configured to operate in accordance with any suitable protocol(s) for communicating over the network 222.

In the illustrated example, the scanner 204 includes processor 224 such as, for example, one or more microprocessors, controllers, and/or any suitable type of processor. The scanner 204 further includes a memory 226 (e.g., volatile memory, non-volatile memory) accessible by the processor 224 (e.g., via a memory controller). The example processor 224 interacts with the memory 226 04 to obtain, for example, machine-readable instructions stored in the memory 226 corresponding to, for example, the operations represented by the flowcharts of this disclosure, including those of FIGS. 3 and 4. Additionally or alternatively, machine-readable instructions corresponding to the example operations described herein may be stored on one or more removable media (e.g., a compact disc, a digital versatile disc, removable flash memory, etc.) that may be coupled to the scanner 204 to provide access to the machine-readable instructions stored thereon.

The scanner 204 of FIG. 2 also includes input/output (I/O) interfaces 228 to enable receipt of user input and communication of output data to the user, an input device 230 for receiving input from the user, and a display 232 device for displaying data, alarms, and other indications to a user.

In some examples, the image processor 216 identifies the indicia 212 captured in an image, e.g., by performing edge detection and/or pattern recognition, and the indicia decoder 218 decodes the indicia and generates object identification data corresponding to the indicia 212. The scanner 204 includes that object identification data in image scan data sent from the scanner 204 to the remote server 220.

In some examples, the image processor 216 is further configured to capture images of the object 210 and send those images in the image scan data to the remote server 220, which then determines object identification data based on the image data.

In some examples, the image processor 216 identifies physical features of the object 210 captured by the camera 206. Example physical features include the peripheral shape of the object, the approximate size of the object, a size of the packaging portion of the object, a size of the product within the packaging (e.g., in the case of a packaged meat or produce), a relative size difference between a size of the product and a size of the packaging, a color of the object, packaging, and/or good, images on the object, text on the object, Point-of-Sale lane and store ID from where the item was scanned, shape of product, weight of product, variety of the product especially for fruits, and freshness of the product. The image processor 216 may send these physical features within the image scan data to the remote server 220.

In an example, the remote server 220 is an image processing and object identification server 220 is configured to receive images (and optionally other image scan data, such as decoded indicia data, physical features, etc.) from the scanner 204 and perform object identification and in particular improper object detection techniques, including at least some of the processes described in reference to FIGS. 3 and 4.

In the illustrated example, the remote server 220 may include one or more general-purpose (e.g., microcontrollers and/or microprocessors) or special-purpose processors 240 and a memory 242 storing instructions that, when executed, implement operations of the example methods described herein, including those of FIGS. 3 and 4. The memory 242, like the memory 232, may be a non-transitory memory and can include one or several suitable memory modules, such as random access memory (RAM), read-only memory (ROM), flash memory, other types of persistent memory, etc.

In the illustrated example, the remote server 220 includes an indicia manager 244, which may collect an indicia data determined by the indicia decode 218 and sent by the scanner 204 and communicate that indicia data to an inventory management controller 246 for determining object identification data that corresponds to the indicia 212. That object identification data identifies the object 210 based on the decoded indicia 212. In examples where the scanner 204 does not first decode the indicia 218, the indicia manager 122 may perform indicia identification and decoding operations. For example, images captured at the scanner 204 and sent to the server 220 may be sent to the indicia manager 122 which identifies an indicia in the images and decodes that indicia, sending the decoded indicia data to the inventory management controller 246 for determining object identification data.

In the illustrated example, the server 220 is additionally configured to determine a second and separate (non-symbology based) object identification data using the images captured of an object, such as the object 210. In the example of FIG. 2, the server 220 includes an imaging features manager 248 that receives the images from the scanner 204 and performs image processing to identify one or more physical features of the object 210, such as the peripheral shape of the object, the approximate size of the object, a size of the packaging portion of the object, a size of the product within the packaging (e.g., in the case of a packaged meat or produce), a relative size difference between a size of the product and a size of the packaging, a color of the object, packaging, and/or good, images on the object, text on the object, Point-of-Sale lane and store ID from where the item was scanned, shape of product, weight of product, variety of the product especially for fruits, and freshness of the product. In other examples, the physical features may be determined wholly or partly at the image processor 216 and transmitted within the image scan data from the scanner 204 to the server 220.

In the illustrated example, the imaging features manager 248 sends the image features to the inventory management controller 246 which determines a second object identification data for the object 210 based on those image features. In some examples, the inventory management controller 246 includes a trained neural network framework configured to analyze physical features of objects and then identify the object using trained classifiers of that framework. That is, in some examples, the inventory management controller 246 is configured to determine object identification data associated for the object based entirely on physical features captured in an image, without resorting to other information, such as a symbology on the object.

While in FIG. 2 the scanning station 202 and the server 220 are shown remote to one another communicatively coupled through the network 222, in other examples, the server 220 may be implemented in whole or in part within the station 202. For example, the imaging system 100 may be implemented to include any of the elements described within the server 220. For example, the scanning station 202 may include a neural network framework for implementing the inventory management controller 246 and the image features manager 248. Furthermore, in some examples, features of the server 220 may be implemented on other remotely connected servers. For example, the server 220 may be configured within an imaging system along with the scanning station 202 and the inventory management controller 246 may be executed by a remotely connected inventory management system.

FIG. 3 is a block diagram of an example process 300 for improper product detection as a may be performed by the imaging system 100 and remote server 130 in FIG. 1 or by the scanning station 202 and remote server 220 in FIG. 2. At a process 302, one or more images of a product are captured by a symbology reader, such as a barcode reader, and those images are sent to a remote server in the form of image scan data. In some examples, at the process 302, object identification data for the object is determined at the symbology reader. For example, in various embodiments, the symbology reader analyzes the images, identifies a barcode in the images, and decodes the barcode to generate a barcode payload as object identification data. The symbology reader sends that object identification data along with the image(s) to the remote server as the image scan data. In various embodiments, the symbology reader analyzes the images and determines an image-based object identification data. This imaged-based data is not based on a decoded barcode, but rather is identification data determined from physical features captured in the image. In some such examples, the symbology reader may have a trained classification system, such as a trained convolutional neural network, trained to classify images and to identify object identification data based on those classifications. In these examples, the imaged-based object identification data is sent to remote server along with the image data, as image scan data.

As shown in FIG. 3, at a process 304, the remote server receives the image scan data from the symbology reader, and analyzes received image scan data to determine a first object identification data at a process 306 and a second object identification data at a process 308. In some examples, the process 306 performs an image analysis to determine the object identification data, for example, by applying received images to trained classification system, such as a trained convolutional neural network, trained to classify images and to identify object identification data based on those classifications. That is, in such examples, the image-based object identification data is determined at the remote server. In other examples, the image-based object identification data is determined at the symbology reader, and the remote server identifies that data within the image scan data and strips that data at the process 306, for consumption. In the former example, that of the remote server, a neural network framework may examine received images and identify physical features in the images. In some examples, at the process 306, a remote server uses an image features manager to identify the physical features. With the features identified, a neural network framework of the remote server analyzes those physical and determines an object identification data associated with the object based on the physical features. For example, the neural network framework may identify the object from these physical features, check the object against an inventory management controller, and determine a barcode for the identified object, where that barcode serves as the corresponding product information.

In some examples, the process 308 determines indicia-based object identification data, for example, by identifying barcode payload data within the image scan data and stripping that data at the process 308, for consumption. In some examples, the indicia-based object identification data is generated at the remote server.

In FIG. 3, a process 310 determines if the two product identification data match (e.g., if the indicia-based data from process 308 matches the object-based data from process 306). If a match is identified, then the remote server, at a process 312, authenticates the product and generates a condition satisfied signal which is sent back to the symbology reader.

If a match is not identified at 310, then at a process 314 a release condition state is entered, and the generation and/or communication of the condition satisfied signal is paused while the process 300 awaits a release condition. If a release condition is met at a process 316, then control is passed to the process 312 for generating the condition satisfied signal and sending that signal to the symbology reader.

If a release condition is not met at the process 316, then a release condition response action is performed at a process 318.

In some examples, in response to the first objection identification data not matching the second object identification data, the process 318 returns control to the process 302 or the process 304, such that one or more subsequent images of the object captured by the symbology reader is analyzed for a match of identification data. If the identification data from processes 306 and 308 do not match for one or more subsequent images as well, then the process 318 determines that an improper product has been detected and, as a result, at a process 320, a condition failed signal is generated and displayed on a digital display associated with the remote server or is sent to any remote monitor, such as a monitor of a manager.

In some other examples, the process 318 instructs the process 320 to generate the condition failed signal, send that signal to a remote monitor, and await a release condition from the remote monitor. If the remote monitor executes a release condition, for example, by using an input device, interface, or a monitor to input a release condition instruction, then the remote server may pass control to process 312, which generates and sends the condition satisfied signal to the symbology reader. In this way, the release condition may be controlled by a remote monitor, so long as the remote monitor responds with a release condition instruction in a sufficient amount of time to override the identification matching error. In some examples, the process 300 is be executed for a certain amount of time before a conditional failed signal is generated and communicated to the symbology reader and/or to a remote monitor. Such universal timeout may be set to an amount time chosen to minimize frustration by the customer attempting to scan an image using a symbology reader.

FIG. 4 is a block diagram of another example process 400 for improper product detection as a may be performed by the imaging station 100 and remote server 130 in FIG. 1 or by the scanning station 202 and remote server 220 in FIG. 2.

At a process 402, a plurality of images of a product are captured by a symbology reader, such as a barcode reader, and those images are collectively sent to a remote server in the form of image scan data. At the process 402, an indicia associated with the plurality of images is determined, for example, by a symbology reader identified a barcode or other indicia in the images captured by the symbology reader, decoding the indicia, and identifying, from the indicia, indicia-based identification data. That indicia-based identification data identifies the product associated with the indicia, in an inventory management system, for example. The symbology reader sends the image scan data, which includes the plurality of images and the indicia-based identification data, to the remote server (received at process 404), which is an inventory management system, in the illustrated example.

The inventory management system, at a process 406, determines an object-based identification data from that received image scan data. For example, in some example, the process 406 performs an image analysis to determine the object identification data, for example, by applying the received plurality of images to trained classification system, such as a trained convolutional neural network, trained to classify images and to identify object identification data based on those classifications. In some examples, the object-based identification data is determined at the inventory management system uses a neural network framework to examiner the plurality of images and identify physical features in the images. An image features manager, with the inventory management system, identifies physical features; and with the features identified, the neural network framework analyzes those physical and determines an object-based identification data based on the physical features. For example, the neural network framework may identify the object from these physical features, check the object against an inventory dataset, and determine a barcode for the identified object, where that barcode serves as the corresponding product information.

In various examples, the process 406 determines object-based information data for each of the plurality of images to generate a set of object-based information data containing information data over repeated cycles.

In the illustrated example, at a process 408, the inventory management system strips the indicia-based object identification data from the image scan data. In other examples, the indicia-based object identification data is generated at the inventory management system, in accordance with techniques described herein. In contrast to the repeated cycles of object-based information data from process 406, the process 408 may determine the indicia-based information data once for the entire plurality of images received from process 404. For example, the image data sent from the symbology reader at process 402, while containing a plurality of images of the object, may contain a single indicia-based identification data.

In FIG. 4, a process 410 determines if the two product identification data match (e.g., if the indicia-based data from process 408 matches the object-based data from process 406) over repeated cycles. That is, in some examples, the process 410 determines if the resulting object-based identification data from each image matches the indicia-based identification data. In some examples, the process 410 determines if all object-based identification data matches the indicia-based identification data. In some examples, the process 410 determines if a continuous number of images generate object-based identification data that matches.

In any event, if a match is identified over repeated cycles, then the inventory management system, at a process 412, authenticates the product and generates a condition satisfied signal which is sent to a user of the inventory management system.

If a match is not identified over repeated cycles, then at a process 414 the repeated image scan cycle is determined to be a failed scan and a failed scan signal is sent to a user of the inventory management system.

In either case, in the illustrated example, a process 416 awaits release of the received condition satisfied signal or the failed scan signal by the user of the inventory management system. For example, the determinations of processes 412 and 414 are sent to the process 416, which provides the received signal as a display and/or audible indication to a manager. In this way, at a process 418, the manager can determine whether to release or override the determination, i.e., either the condition satisfied or failed scan. Releasing the determination results in the either the condition satisfied signal or the failed scan signal being communicated to the symbology reader. Overriding the determination results in no signal communicated to the symbology reader, a condition satisfied signal communicated to the symbology reader, or a failed scan signal communicated to the symbology reader, depending on the override.

In some examples, the captured image or images from the symbology reader are communicated by the process 412 or 414 to the process 416, and displayed so that the manager can see an image of the scanned product to assist the manager in determining whether to override or release the determination. In some examples, the manager of the inventory management system sends an instruction of whether to release or override a determination using an input device, such as a keyboard, keypad, touch-sensitive display, or otherwise.

In the example of FIG. 4, a user of an inventory management system is able to control the release condition before a condition satisfied signal or a failed scan signal is communicated to the symbology reader.

In some examples, at the process 402, the symbology reader sends a symbology reader identifier in the form of identification data that the inventor management system, or other remote server, can use to identifying the particular symbology reader from among a plurality of symbology readers connected to the system.

In some such examples, the processes 412 or 414 may send that symbology reader identifier to the user of the inventory management system, so that the user may know which symbology reader has generated the signal (condition satisfied or failed scan) and use that information in determining whether to satisfy a release condition.

In some examples, the processes 412 or 414 may additionally send at least one of the plurality of images to the user of the inventory management system. In some examples, the processes 412 or 414 may additionally send the indicia-based identification data and the object-based identification data to the user of the inventory management system. In some examples, the processes 412 or 414 may send the symbology reader identifier, one or more images of the object, the indicia-based identification data, and the object-based identification data, along with the symbology reader identifier, all of which may be used by the user to determine whether to satisfy the release condition and pass control to the process 418.

In some examples, the present techniques are implemented on symbology readers that default to providing a user with an audible indication, such as a beep, or a visual indication, such as a LED flash, each time the user successfully scans a barcode. That is, in a default state, these symbology readers provide an audible or visual indication to a user of the reader automatically in response to the user scanning a barcode and the barcode reader successfully decoding the barcode. No validation is performed before providing the indication.

In such examples, the present techniques, in essence, override this default state, however, and block the provision of the audible or visual indication to the user, until a validation of the scan can be separately performed, either through validation using a remote server or validation performed at the point of sale, such as at the system 100 configured to perform the methods described herein.

In such examples, the symbology reader scans and decodes the barcode on an object generating an indicia-based identification data. The symbology reader also captures one or more images of the object. The symbology reader, in response to successfully decoding the barcode, instead of providing the user an audible or visual indication, sends the indicia-based identification data and the one or more images to a server for validation. The server may be remotely coupled to the symbology reader through a communication network or may be part of an imaging system that includes the symbology reader. The server is configured to determine an object-based identification data, form the one or more images. The server then determines if the indicia-based identification data matches the object-based identification data and communicates a condition satisfied signal, in response to such validation. That condition satisfied signal may be communicated to the user of the symbology reader as the audible indication, such as a beep, or visual indication, such as an LED indication, for example. If the server determines that the indicia-based identification data does not match the object-based identification data, the server will not send any condition satisfied signal to the user, but instead will await the user's attempt a rescan the barcode, and the process will start again. If after a predetermined number of failed scans, such as 2 or 3 consecutive failed scans, the server does not identify a match of the indicia-based and object-based identification data, then a failed scan signal is communicated to a user of the inventory management system or other manager for follow-up action. The user or manager can then determine whether to approach the user of the symbology reader, to remotely authorize the failed scan attempt, or take other action.

In some examples, validation of a user of an inventory management system is required even before a condition satisfied signal is to be sent to the user of the symbology reader. For example, the indicia-based identification data and the object-based identification data or the image(s) of the object may be sent from the server to the inventory management system and the server will await instruction from the inventory management system, specifically, from the user thereof, before communicating the condition satisfied signal or the failed scan signal. In this way, the user of the inventory management system can view the image(s) of the object and other compare the identification data before allowing the condition satisfied signal or the failed scan signal to be provided.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A computer-implemented method for improper object detection, the method comprising:

a) receiving, at one or more processors, an image of an object, the image captured by a symbology reader;

b) analyzing, at the one or more processors, the image of the object and determining a first object identification data from the image;
c) analyzing, at the one or more processors, an indicia in the image of the object and determining a second object identification data from the indicia;
d) responsive to analyzing the indicia, determining, at the one or more processors, that the first object identification data matches the second object identification data, and communicating a condition satisfied signal for a user to the symbology reader; and
e) determining, at the one or more processors, that the first object identification data does not match the second object identification data and preventing communication of the condition satisfied signal to the symbology reader and awaiting, at the one or more processors, a release condition, before communicating the condition satisfied signal for the user to the symbology reader.

2. The method of claim 1, further comprising:
in response to determining that the first objection identification data does not match the second object identification data, repeating a)-c) for one or more subsequent images of the object captured by the symbology reader;
upon determining that the first object identification data does match the second object identification data for the one or more subsequent images, thereby satisfying a release condition, communicating the condition satisfied signal for the user to the symbology reader; and
upon determining that the first object identification data does not match the second object identification data for the one or more subsequent images, sending a failed scan signal to a remote monitor.

3. The method of claim 1, further comprising:
in response to determining, at the one or more processors, the first object identification data does not match the second object identification data, sending a failed scan signal to a remote monitor; and
awaiting, at the one or more processors, a release condition from the remote monitor, and communicating the condition satisfied signal for the user in response to the release condition from the remote monitor.

4. The method of claim 1, further comprising:
determining the first object identification data at the symbology reader;
determining the second object identification data at the symbology reader;
communicating the first object identification data and the second object identification data to an inventory management system communicatively coupled to the symbology reader through a communication network; and
comparing the first object identification data to the second object identification data at the inventory management system for determining when the first object identification data matches and does not match the second object identification data.

5. The method of claim 1, further comprising:
determining the second object identification data at the symbology reader;
sending the image to an inventory management system communicatively coupled to the symbology reader through a communication network;
determining the first object identification data at the inventory management system; and
comparing the first object identification data to the second object identification data at the inventory management system for determining when the first object identification data matches and does not match the second object identification data.

6. The method of claim 1, wherein the symbology reader is one of a bioptic reader, a barcode reader, or a handheld reader.

7. The method of claim 1, wherein the image of the image scanner is an color imager and the image of the object is a color image.

8. A computer-implemented method for improper object detection, the method comprising:
receiving, at an inventory management system and from a symbology reader, a plurality of images of an object collected over repeated image scan cycles;
receiving, at the inventory management system and from the symbology reader, an indicia-based identification data determined from an indicia associated with the plurality of images;
analyzing, at the inventory management system, the plurality of images and determining an object-based identification data from the image;
determining, at the inventory management system, that the indicia-based identification data matches the object-based identification data over the repeated image scan cycles, and communicating a condition satisfied signal for a user of the inventory management system; and
determining, at the inventory management system, that the indicia-based identification data does not match the object-based identification data over the repeated image scan cycles, and identifying the repeated image scan cycles as a failed scan to a user of the inventory management system.

9. The method of claim 8, further comprising:
receiving, from the symbology reader, a symbology reader identifier, for identifying the symbology reader among a plurality of symbology readers in a location;
providing the symbology reader identifier to a user of the inventory management system;
providing at least one of the plurality of images to the user; and
awaiting instruction from the user before communicating the condition satisfied signal or before identifying the repeated image scan cycles as the failed scan.

10. The method of claim 8, further comprising:
receiving from the symbology reader a symbology reader identifier, for identifying the symbology reader among a plurality of symbology readers in a location;
providing the symbology reader identifier to a user of the inventory management system;
providing the indicia-based identification data and the object-based identification data to the user; and
awaiting instruction from the user before communicating the condition satisfied signal or before identifying the repeated image scan cycles as the failed scan.

11. A system comprising:
a symbology reader comprising:
a housing;
an imaging assembly within the housing and configured to capture a plurality of images of an object; and
a processor and a memory storing instructions that, when executed, cause the processor to:
determine, from one or more of the plurality of images, an indicia-based identification data for the object; and
send the indicia-based identification data and at least one of the plurality of images to a remote server, as image scan data;

and the remote server having a processor and a memory storing instructions that, when executed, cause the processor of the remote server to:

determine, form the at least one of the plurality of images, an object-based identification data for the object;

determine when the indicia-based identification data matches the object-based identification data and communicate a condition satisfied signal for a user of the inventory management system; and determine when the indicia-based identification data does not match the object-based identification data and communicate a failed scan signal to the user of the inventory management system wherein the memory of the remote server stores further instructions that, when executed, cause the processor of the remote server to:

receive, from the symbology reader, a symbology reader identifier, for identifying the symbology reader among a plurality of symbology readers in a location;

provide the symbology reader identifier to the user of the inventory management system;

provide at least one of (i) the at least one of the plurality of images or (ii) the indicia-based identification data and the object-based identification data to the user of the inventory management system; and await instruction from the user of the inventory management system before communicating the condition satisfied signal or the failed scan signal.

12. The system of claim 11, wherein the memory of the remote server stores further instructions that, when executed, cause the processor of the remote server to:

determine when the indicia-based identification data matches the object-based identification data over repeated image scans and communicate the condition satisfied signal for the user of the inventory management system; and determine when the indicia-based identification data does not match the object-based identification data over repeated image scans and communicate the failed scan signal to the user of the inventory management system.

13. A system comprising:
a symbology reader comprising:
a housing;
an imaging assembly within the housing and configured to capture a plurality of images of an object; and
a processor and a memory storing instructions that, when executed, cause the processor to:
determine, from one or more of the plurality of images, an indicia-based identification data for the object; and
send the indicia-based identification data and at least one of the plurality of images to a server, as image scan data;
and
the server configured to:
determine, form the at least one of the plurality of images, an object-based identification data for the object;
determine when the indicia-based identification data matches the object-based identification data and communicate a condition satisfied signal for a user of the inventory management system; and
determine when the indicia-based identification data does not match the object-based identification data and communicate a failed scan signal to the user of the inventory management system,
wherein the server is further configured to:
provide at least one of (i) the at least one of the plurality of images or (ii) the indicia-based identification data and the object-based identification data to the user of the inventory management system; and
await instruction from the user of the inventory management system before communicating the condition satisfied signal or the failed scan signal.

14. The system of claim 13, wherein the server is further configured to:

determine when the indicia-based identification data matches the object-based identification data over repeated image scans and communicate the condition satisfied signal for the user of the inventory management system; and determine when the indicia-based identification data does not match the object-based identification data over repeated image scans and communicate the failed scan signal to the user of the inventory management system.

15. The system of claim 13, wherein the inventory management system is communicatively coupled to the server through a communication network.

* * * * *